Feb. 28, 1961 W. H. SCHUTMAAT 2,973,007
PRESSURE REGULATOR
Filed July 11, 1958

INVENTOR.
WAYNE H. SCHUTMAAT.
BY
Lockwood, Galt, Woodard & Smith
ATTORNEYS.

2,973,007
PRESSURE REGULATOR

Wayne H. Schutmaat, Elkhart, Ind., assignor to Penn Controls, Inc., Goshen, Ind., a corporation Filed July 11, 1958, Ser. No. 747,999

2 Claims. (Cl. 137—505.41)

This invention relates generally to pressure regulators and in particular to a valve construction adapted to regulate gas pressure at extremely low flow rates.

Gas burning appliances, such as hot water heaters, domestic ranges and the like, are customarily connected to a gas manifold or a supply source through one or more control valves, either manually or automatically operated. A gas pressure regulator valve is customarily inserted upstream of the control valve and a pilot gas line supplies gas to a pilot burner from a point downstream of the regulator. The trend of development in the application of constantly burning pilots to particularly, domestic gas ranges has led to the use of pilot burners of the non-aerated type characterized by extremely low gas consumption. These pilot burners require maintenance of only a minute flow of gas thereto. Where the pilot burner is connected downstream of the pressure regulator, the regulator must control the gas pressure to the main burner at normal flow rates, and when the control valve or valves are closed, must also control the pilot burner pressure at greatly reduced flow rates. The result is that where the pressure regulating valve is properly sized to control the pressure to the main burner, it is substantially oversized for controlling the gas pressure to the pilot burner when the main burner is off. In controlling the pressure at low flow rates to the pilot burner, the conventional regulating valve must operate in near-closed position. The valve position necessary to control low flows is not readily attainable in conventional regulators because of inherent tilting of the valve assembly as it moves to closed position. Metal-to-metal seating also makes the proper positioning of the valve difficult.

It is an object, therefore, of the present invention to provide a gas pressure regulator valve construction which is capable of effectively regulating gas pressure both at normal flow rates and at the reduced or minimal flow rates required for low B.t.u. pilot burners.

A further object of the present invention is to provide a gas pressure regulator valve construction utilizing an O-ring which engages the valve seat on a line disposed outwardly of the axial center line of the O-ring, a force moment thereby being applied to the O-ring to roll it along the inclined surface of its mounting groove in the valve member as the valve member moves to seal off the passage through the regulator valve.

The full nature of the invention will be understood from the accompanying drawings and the following description and claims:

Figure 1:
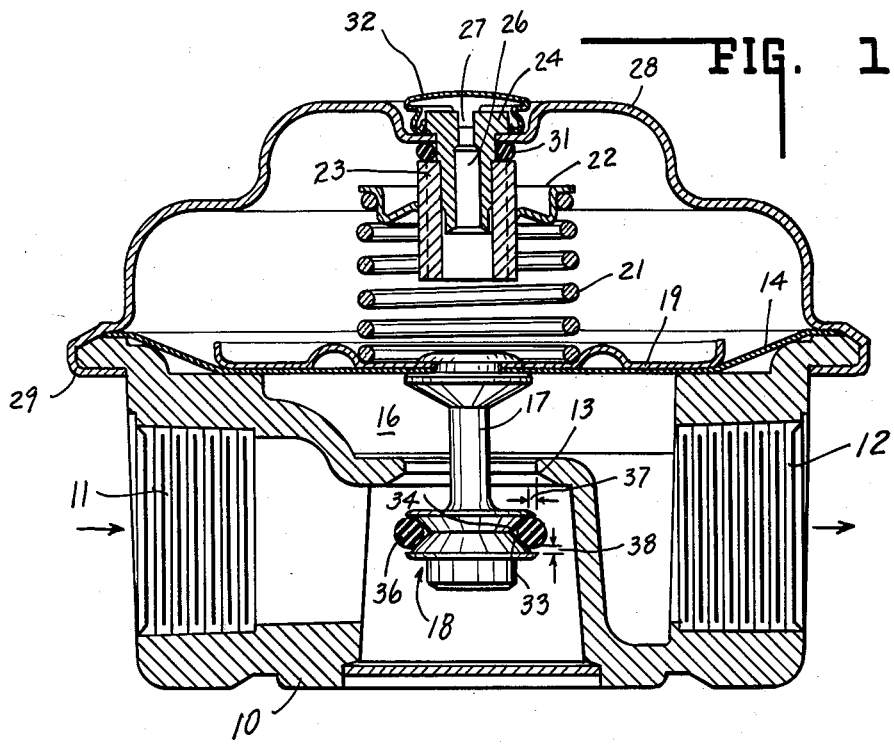
Fig. 1 is a cross sectional side view of a regulating valve embodying the present invention.

Referring initially to Fig. 1, there is shown a pressure regulating valve comprising a body 10 having an inlet passage 11 and an outlet passage 12. The interior of the valve body is formed to provide a valve seat 13 which, when unobstructed, permits gas to flow between the inlet and outlet passages.

The flexible diaphragm 14 provides a movable wall for a pressure chamber 16, the diaphragm having centrally secured thereto the stem 17 of a generally disc-shaped valve member. A backing plate 19 overlies the central area of the diaphragm and seats a compression spring 21. At its upper end the spring is held by a spring retainer member 22 threaded upon an adjusting screw 23.

The adjusting screw takes the form of a sleeve into which is press-fitted a member 24 having a central passage 26 therein and a screwdriver slot 27 across the face of its outer end. The outer end of the member 24 is provided with shoulders which retain a sheet metal top or cover 28. The cover, at its peripheral margin 29, is bent over an outwardly flanged portion of the valve body to rigidly clamp the diaphragm therebetween. An O-ring 31 is seated between the upper end of the member 23 and the adjacent portion of the cover 28. The function of the O-ring is to provide a seal at the area where the member 24 extends through the cover. The O-ring also incidentally provides tension on the head of the member 24 so that vibration will not alter the valve setting. The upper end of the member 24 is covered by a removable cap 32 having a suitable aperture therein (not shown) venting the passage 26 and consequently the space above the diaphragm to atmosphere. It will be understood that by removing cap 32 the adjusting screw 23 may be rotated and adjust the compression of the spring 21 and consequently the pressure setting of the regulator.

The present invention is particularly embodied in the construction of the valve member 18 and action of the O-ring accommodated thereon with relation to the valve seat. The valve disc is provided with a circumferential groove which is generally V-shaped and has an inclined surface 33 remote from the valve seat 13 and an inclined surface 34 adjacent the valve seat. The groove accommodates an O-ring 36 sized so that its cross sectional center is spaced inwardly of the valve seat 13 as indicated at 37. The inclined surface 33 of the groove is extended somewhat so that with the O-ring in normal position, as shown in Fig. 1, a distance as indicated at 38 separates the O-ring from the lower margin of the inclined surface 33.

Figure 3:
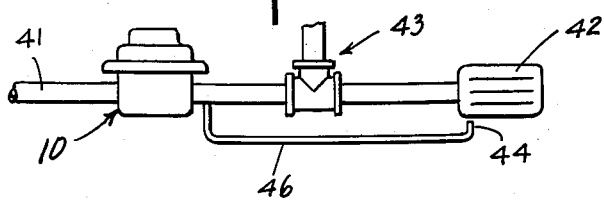
Fig. 3 is a schematic illustration of the pilot and main burner gas connections for a typical application of the regulating valve of the present invention.

Referring to Fig. 3, the pressure regulating valve, in a conventional application, may be connected to a gas supply, which provides gas to a main burner 42, the supply of gas to the main burner being controlled by a control valve 43. The low B.t.u. pilot burner 44 is connected by means of the line 46 to the down stream side of the pressure regulating valve.

In operation, with the regulating valve connected as just described, the outlet pressure of the valve, and consequently the pressure at the main burner, will be held relatively constant even though the supply pressure at the inlet of the regulating valve should vary over a relatively wide range. This regulating action occurs because of the movement of the valve member opposed by the spring 21 with relation to the seat 13.

When the control valve 43 is closed, shutting off the supply of gas to the main burner, the regulating valve is then called upon to regulate the pressure to the pilot burner at a relatively low flow rate. Because of the obstruction to the flow of gas provided by the pilot burner, the pressure in the chamber 16 is only slightly below the pressure in the inlet passage 11 of the regulating valve, and the valve member 18 positions the O-ring closely adjacent the seat 13.

Figure 2:
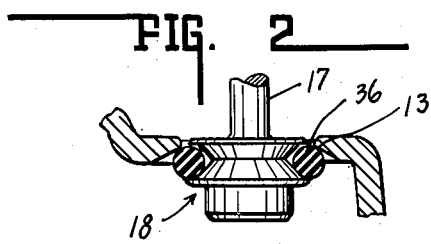
Fig. 2 is an enlarged view of the valve member and its seat illustrating the valve member in sealing position.

From tests of the action of the valve structure, it has been found that as the valve member is moved toward closed position, the O-ring approaches the seat in a somewhat randomly tilted manner so that initially only a portion of the O-ring touches the valve seat 13. Further upward movement of the valve member brings the O-ring in line with the opening bounded by the valve seat, and subsequent upward movement causes the O-ring to roll along the inclined surface 33 for a distance approximately such as that indicated at 38 in Fig. 3. At the termination of this rolling motion of the O-ring the opening bounded by the valve seat is sealed and the valve member and O-ring are in the position shown in Fig. 2. Complete sealing off of the passage apparently does not occur until the O-ring has substantially completed its rolling action and the initial contact of the O-ring with the valve seat permits a small flow of gas between the inlet passage and the outlet passage of the regulating valve. The mounting of the O-ring on the valve member so that complete sealing off of gas through the valve does not occur until the rolling action of the O-ring has been completed thus permits the valve to regulate its outlet pressure at minimal flow rates in the face of relatively wide variations in gas supply pressure.

It should be emphasized that the extension of the inclined surface 33 to accommodate a rolling action of the O-ring and the positioning of the O-ring so that its cross sectional center is somewhat inward of the valve seat 13 whereby a force moment is applied to the O-ring, are primary factors in providing the regulating valve with the ability to regulate pressure at extremely low flow rates. The valve construction is thus particularly adapted for use in applications where low B.t.u. pilot burners are connected to the gas supply at a point downstream of the regulating valve.

While the invention has been disclosed and described in some detail in the drawings and foregoing description, they are to be considered as illustrative in character, as other modifications may readily suggest themselves to persons skilled in this art and within the broad scope of the invention, reference being had to the appended claims.

The invention claimed is:

1. In a fluid pressure regulator valve, flow control means comprising: means defining first and second chambers; means defining a flow passage between said chambers and having an annular inlet portion defining a frusto-conical valve seat confronting the first chamber; a valve stem extending longitudinally through said flow passage; a pressure responsive flexible diaphragm across said second chamber having a randomly disposable mid-portion; means securing one end of said valve stem to said diaphragm mid-portion for reciprocation of the valve stem generally coaxially to said flow passage and freely to permit a slight random displacement of the axis of the stem relative to the axis of the flow passage; a valve member on said valve stem in said first chamber for controlling fluid flow through said flow passage, said valve member including a portion having a circumferential groove provided with a flared surface coaxial with the stem and windening away from said inlet portion, and a resilient ring seated in said groove for selective engagement with said valve seat, said valve seat having an angle relative to the axis of said flow passage greater than pproximately 45° whereby engagement of the ring with only a limited portion of the valve seat as a result of a displacement between said ring and valve seat axes causes said ring to roll over said flared surface to vary the annular diameter thereof and thereby regulate accurately the fluid flow through said flow passage at low volume rates of flow.

2. A pressure regulator valve for use in regulating the pressure of gas delivered at large volume rates of flow to a main burner and pressure of gas delivered at small volume rates of flow to a pilot burner, comprising: means defining inlet and outlet chambers; means defining a flow passage between said chambers and having a frusto-conical surface defining a valve seat confronting the inlet chamber, the angle of the frusto-conical surface to the axis thereof being greater than approximately 45°; a valve stem extending longitudinally through said flow passage; a flexible diaphragm across said outlet chamber and confronting said flow passage; means biasing the diaphragm toward said flow passage against the fluid pressure in said outlet chamber, said means permitting a random tilting of the mid-portion of the diaphragm; means connecting said valve stem to said mid-portion of the diaphragm to extend said valve stem generally coaxially to said flow passage so that any small random tilt of the mid-portion of the diaphragm produces a corresponding tilt of the axis of the valve stem relative to the axis of the flow passage; a valve member on said valve stem in said inlet chamber for controlling fluid flow through said flow passage, said valve member including a portion having a circumferential groove provided with a frusto-conical surface coaxial with the stem and widening away from said valve seat, and a resilient O-ring seated in said groove for selective engagement with said valve seat, whereby engagement of said ring with only a limited portion of the circumference of the valve seat as a result of any tilted relationship of said O-ring and valve seat axes causes said O-ring to engage progressively the remaining portions of the valve seat circumference and to roll over said frusto-conical surface of the valve member groove to vary the annular diameter thereof and thereby regulate accurately the fluid flow through said flow passage at low volume rates of flow.

References Cited in the file of this patent

UNITED STATES PATENTS

| | | |
|---|---|---|
| 481,761 | Hughes | Aug. 30, 1892 |
| 1,313,554 | Nielsen | Aug. 19, 1919 |
| 2,481,482 | Green | Sept. 13, 1949 |
| 2,713,989 | Bryant | July 26, 1955 |
| 2,737,201 | St. Clair | Mar. 6, 1956 |
| 2,761,389 | Turner | Sept. 4, 1956 |